March 12, 1940. W. A. MEIGHAN 2,193,236
ROPE FITTING
Filed Nov. 16, 1937 2 Sheets-Sheet 1
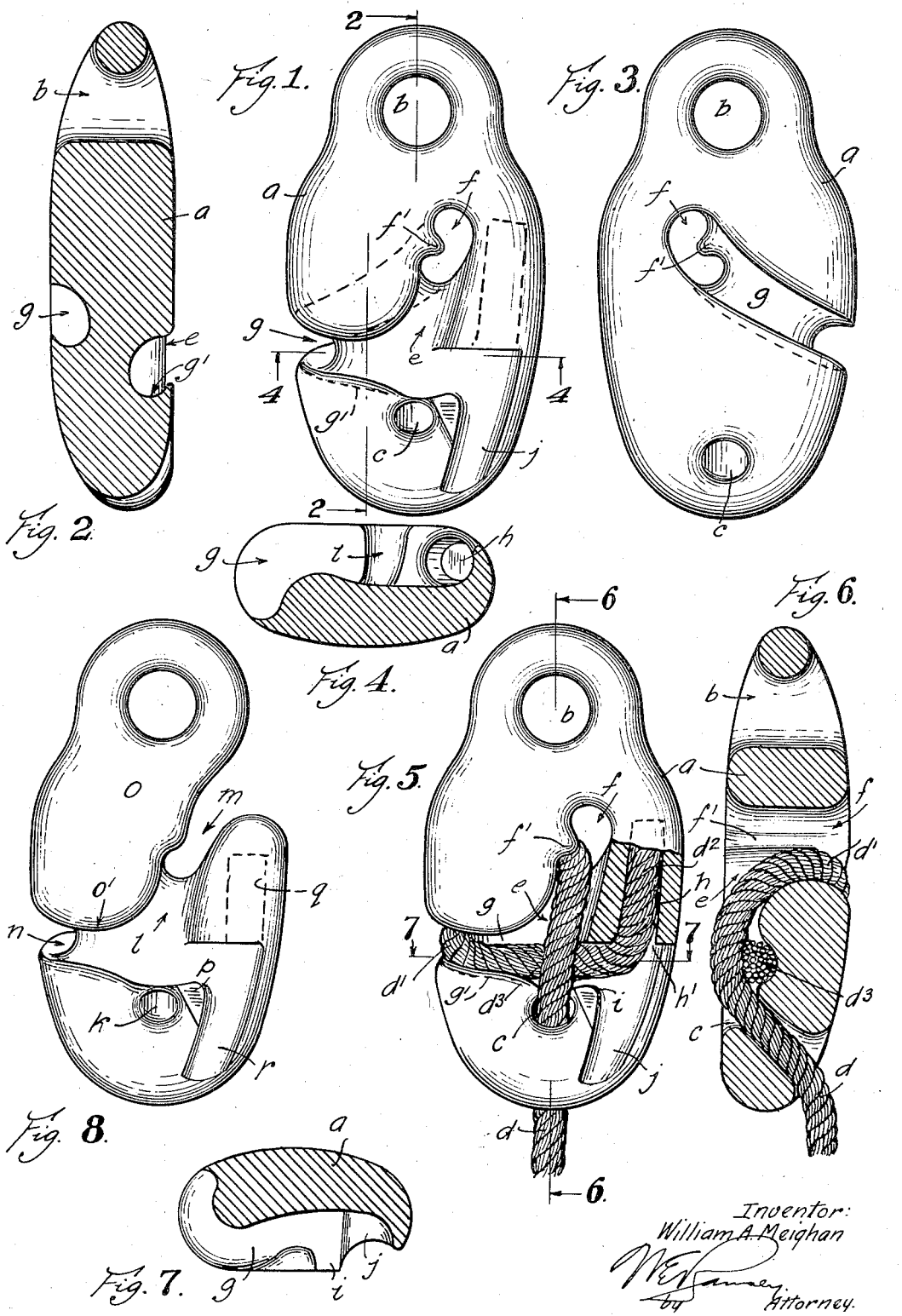
Inventor:
William A. Meighan
Attorney.

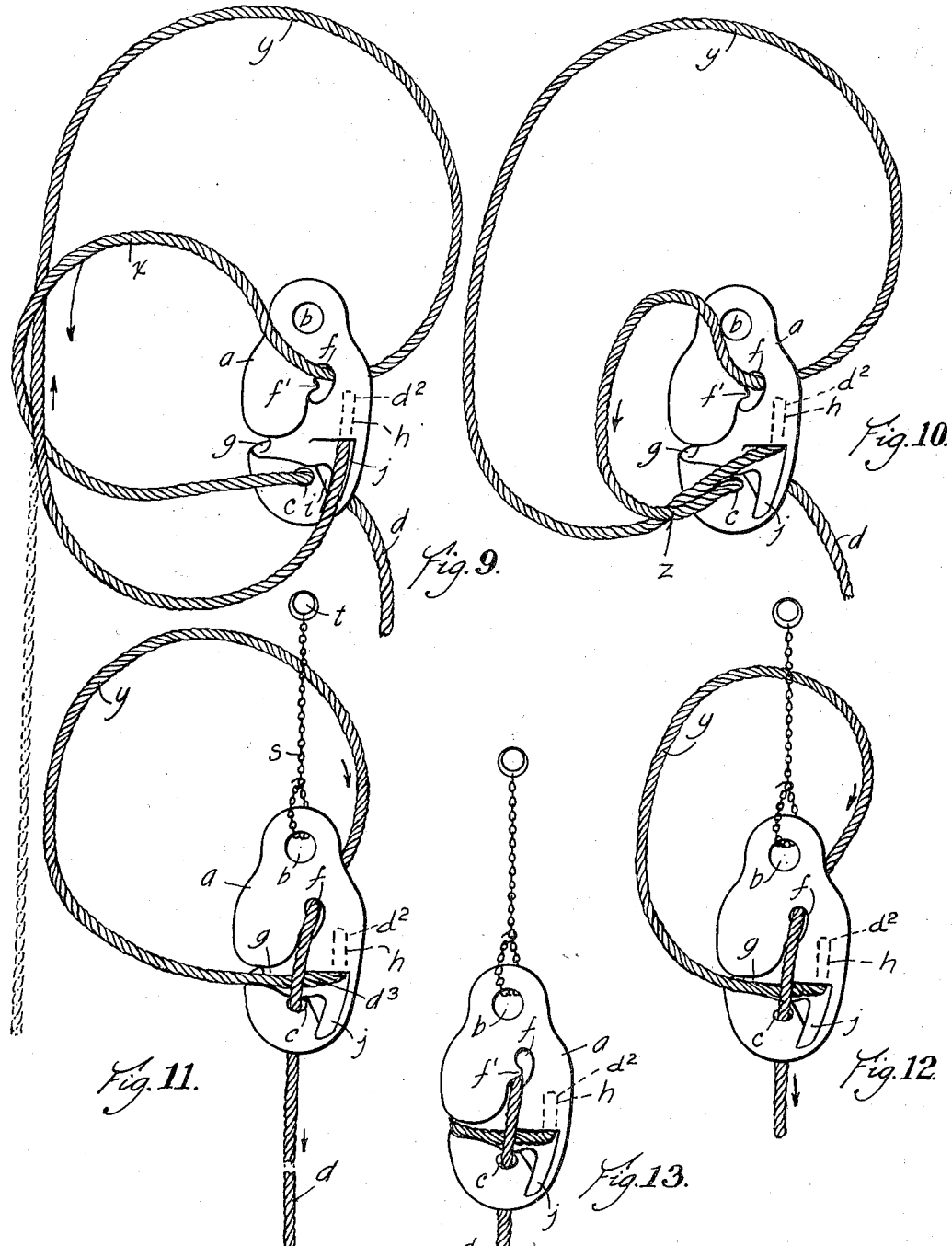

Patented Mar. 12, 1940

2,193,236

UNITED STATES PATENT OFFICE 2,193,236

ROPE FITTING

William A. Meighan, Portland, Oreg.

Application November 16, 1937, Serial No. 174,834

11 Claims. (Cl. 24—129)

The object of my invention is to provide a fitting which may be secured to the end of a flexible element, such as a cable or wire rope, by a simple loop which may be formed by hand and which when loosely defined can be pulled into position by tension applied to said flexible element. My invention has its greatest advantage in logging and construction work. It is impracticable to provide workmen with tools for securing the end of a flexible element to fittings and thus it was considered impracticable to make repairs on the job. Heretofore it was deemed necessary that said fittings be secured to the cables and the like in a repair shop, blacksmith's shop or other place where proper tools were available.

By my invention it is possible to secure my improved type of fitting to the end of a flexible element by forming the end of said element into a loosely formed knot. The extreme end of said flexible element is arranged in a socket and the loop can then be arranged manually so that when tension is thereafter applied to the rope, the latter binds itself into a tight knot about said fitting without tending to pull the end of said flexible element free. Said loop is formed so that the tension applied to said flexible element tends to seat the knot formed by the looped end of such cable more tightly to the fitting. The end of said cable is arranged in said knot to snub the intermediate portions of said cable to prevent the detachment of said rope therefrom. All of the portions of said rope which are subject to pulling strain pass about smooth corners and make relatively gradual curves so that the full strength of the rope can be utilized.

I attain this object by providing a coupling, somewhat elongated in form, with a transverse eye formed at one end. The end of the flexible element to be bound thereto can be inserted laterally thru said eye, wound about the body in a loosely formed loop encircling said body, and the extreme end of said element may be inserted in a pocket open at one end and extending substantially longitudinally of the coupling. The looped portion of said flexible element is formed so as to overlie other portions and at the point where said portions cross each other, they are arranged substantially normal, with the uppermost course binding or pinching the underlying course tightly against the body. The loosely formed loop lies substantially in the longitudinal plane of the body of the coupling, although it encircles the latter. The eye extends substantially normal to said plane and the pocket in which the extreme end of said flexible element is inserted, extends substantially longitudinally thereof. Thus, when the end of a flexible element is looped to follow the configurations of the groove formed in said body, the subsequent tension tends to bind the looped end of the flexible element in place and distorts the flexible element. The knot tends to remain tight and does not spring out under the influence of the inherent elasticity of a wire cable to become unseated when tension is released. Thus, it is not necessary to provide fastening devices of any kind, and all such accessory fastening devices as ferrules, clips, studs, screws, clamps or other fastening means are avoided. Thus, the end of a flexible element, such as a wire rope or cable, can be looped about said fitting and can be secured thereto firmly and securely by any lineman or workman without difficulty and without special tools.

Further details of my invention are hereinafter described with reference to the accompanying drawings, in which:

Fig. 1 is an elevation of a coupling embodying my invention in which the arrangement of the annular groove or seat is indicated in dotted lines, as is the longitudinally extending pocket for receiving and holding the extreme end of said flexible element;

Fig. 2 is a longitudinal sectional view taken on the line 2—2 in Fig. 1 and shows a cross-sectional view thru the annular groove as well as thru the eye to which the coupling is secured;

Fig. 3 is an elevation of said coupling showing the reverse side to that shown in Fig. 1;

Fig. 4 is a transverse horizontal section taken on the line 4—4 in Fig. 1 thru the annular groove and looking into the pocket;

Fig. 5 is a view similar to Fig. 1 except that the flexible element is shown looped and secured therein, with the extreme end of said element shown inserted in said pocket;

Fig. 6 is a longitudinal sectional view taken substantially on the line 6—6 in Fig. 5, showing the manner in which the loop is formed in said flexible element;

Fig. 7 is a transverse section taken on the line 7—7 in Fig. 6, with the flexible element shown removed therefrom, illustrating the groove by which the end of said flexible element is guided into the pocket;

Fig. 8 is an elevation of a modification of my invention in which the flexible element passes thru an eye but is thereafter only looped about rather than inserted thru the body of the coupling; and Figs. 9 to 13, inclusive, are diagrammatic illustrations of the manner in which the end of a wire rope or cable initially may be fitted to said coupling, the extreme end inserted in the socket portion thereof, and the intermediate portion formed into two overlying loops relatively arranged to be drawn successively by tension about said fitting and secured in tight engagement therewith.

A rope fitting embodying my invention is preferably made of an integral casting or other formed body $a$. Said body is more or less elongated in form and is more or less symmetrical about a longitudinal axis. At one end of said body an eye $b$ is formed so that said coupling can be secured to some other fastening device such as a link, cable, shackle, clevis, pin or the like. It is to be understood that said rope fitting is adapted to secure a length of cable to such type of fastening device. To this end, a transverse aperture $c$ is formed thru the opposite end of said body, and a length of cable $d$ may be passed therethru and secured to said body by a loosely formed knot hereinafter described.

Said transverse aperture extends thru said body at an oblique angle, as is illustrated in Fig. 6, but said angle extends more thru the thickness of the body than lengthwise thereof so that a relatively sharp bend is formed in said cable as it leaves said aperture $c$. As has been pointed out heretofore, the principal purpose of my invention is to provide a rope fitting which may be easily and quickly secured to the end of a cable. To this end, said fitting is adapted to accommodate the end of said cable formed into a loop $d'$. The face of said body is provided with a longitudinal passageway $e$ extending along the flat or left-hand face of said body, as viewed in Fig. 6. Said passageway $e$ leads from the aperture $c$ to another transverse aperture $f$ extending thru said body. It is to be noted that said aperture $f$ is not circular in form. A protuberance $f'$ extends into said aperture to leave a hole which might be described as ear-shaped in section. The looped end $d'$ when seated, as illustrated in Fig. 5, is located below said protuberance, that is, in the lower part of the opening $f$. At this point, the cable is wedged tightly in place and cannot be lifted therefrom without the expenditure of a great deal of effort. Extending from the far side of said secondary transverse aperture $f$, as viewed in Fig. 5, is a helically formed external groove $g$ which extends about the rounded back of said body to the left-hand side thereof, as viewed in Figs. 1, 3 and 5, a continuation of said groove extending from the point where it intersects itself and bending sharply toward a pocket, hereinafter described. Upon the front face of said body, that is, the flat face or left-hand face, as viewed in Fig. 6, said groove $g$ intersects the longitudinal passageway $e$. Said passageway $e$, said secondary aperture $f$, and groove $g$ might be said to constitute a continuous way for the cable, rope, or other flexible element.

A longitudinally extending pocket $h$ having an open mouth $h'$ is arranged at one side of the longitudinal passageway $e$. The extreme end of the end $d2$ of the cable is adapted to be forced into said pocket. The longitudinal pocket $h$ extends substantially parallel to the passageway $e$ and is substantially normal to the far end of the groove $g$. The transverse aperture $c$, the longitudinal passageway $e$, the secondary transverse aperture $f$, the helically formed groove $g$, and the bore of the pocket $h$ are substantial continuations of each other. Thus, when the cable is formed into a loop $d'$, and the extreme end $d2$ is first seated tightly within said pocket, it is caused to bend sharply as it leaves the open mouth $h'$ of said pocket. The cable is relatively stiff and it is difficult to make this turn. I thus form a shoulder $i$ below and slightly to one side of said pocket $h'$. Against said shoulder, said cable can be bent to lie along the groove $g$. Said groove preferably is formed with a trough-like bottom $g'$ to hold said cable in place.

Lying at one side of said shoulder $i$ is a longitudinally extending grooved guide slot $j$. Said guide slot is alined with the bore of the pocket $h$ and is used initially to help guide the end $d2$ of the loop into position. Said guide slot is curved somewhat, as is illustrated in Fig. 7, and by forcing the end of said cable downwardly against said guide slot, the frayed, broomed or mushroomed ends of the strands forming the cable can be easily guided into the open end $h'$ of said pocket. When said loop $d'$ is initially formed loosely, the section of the cable passing thru the secondary aperture $f$ lies above the protuberance $f'$. When tension is applied by some pulling device the loop tightens into place and is slipped under the said protuberance $f'$ and is locked into position. The distance from the point of said protuberance to the opposite side of said aperture is preferably less than the diameter of the cable. The tension and the slight sliding in tightening said looped end permits said cable to be moved under said protuberance and when it is thus in position and the looped end of the cable tightened so that the cable overlies an intermediate portion as at $d3$ and takes a bight thereon, the loop is seated tightly and does not tend to become unseated. The sharp or substantially square bend in the cable in leaving the mouth $h'$ of the pocket, the bearing of said cable in the trough-like bottom of the helical groove $g$, and the pinching of said cable underneath said protuberance $f'$, all combine to cause said loop to remain tight even in the absence of tension.

It is to be noted, however, that the aperture, the groove and the passageway against which the cable bears in pulling are rounded so that the loop is caused to be formed upon relatively gradual curves so that nicking of the cable is eliminated. Nicking or sharp bends might tend to produce early fracture of said cable at the points of said nicking or sharp bending. The cable for which said fittings have possibly their greatest utility are made of relatively hard steel, and I prefer to make said fittings of manganese steel. Manganese steel is quite tough but it is somewhat softer than the wire rope. Thus, said wire rope tends to gouge into the manganese steel and to become seated or keyed thereby. I deem it necessary to take advantage of all of these structural characteristics because it is my intention to provide a rope fitting which may be secured to the end of a cable without the use of tools. If said fittings are used in structural work or in logging it is impracticable to provide workmen with tools which must be carried with them. It is necessary that if said fittings are to be secured to the end of a cable that the operations in fitting said parts together initially be subject to accomplishment without tools and with only as much power as can be generated within the strength of an average man. Of course, after the loop has been formed and the parts seated, the loop can be tightened by auxiliary power, such for example as a hoisting engine, logging engine, tractor or the like, with which said cable and fitting are adapted to be used.

In Fig. 8 I illustrate a modification of my invention in which it is necessary to insert the end of the cable thru but one transverse aperture $k$. The end of a length of cable to be secured thereto can then be passed upwardly along an encircling way comprising a longitudinal passageway $l$, thru an elongated groove $m$, and around a helically formed groove $n$. This modification differs from the first embodiment illustrated in Figs. 1 to 7, inclusive, by the elimination of the transverse aperture $f$. By forming said aperture into a slot, one threading operation of the cable can be eliminated and the loop can be formed by passing it about the narrowed portion $o'$ of the body of the fitting $o$. With the exception of this difference, the fittings are identical. The body $o$ is provided with a shoulder $p$ and with a pocket $q$ for receiving the end of the cable. A guide slot $r$ is provided, leading into the mouth of said pocket $q$ to aid in the insertion of the end of said cable into said pocket, and the operation in forming said loop and the relationship of the parts of said fitting are the same as in said first embodiment and said characteristics and advantages with regard to the modifications shown in Fig. 8 will thus not be repeated.

Said second modification has its greatest use with small cable and hemp rope and the like where it is possible to form a loop about the body of the fitting almost wholly by hand. In the first embodiment the seating of the loop and the fitting of the section $d3$ in position can be accomplished with heavy wire rope only by the use of substantial tension generated by a hoisting machine. The specific manner in which said loop is initially formed and later tightened is shown progressively in Figs. 9 to 13, inclusive.

The fitting illustrated in Figs. 1 to 7, inclusive, is adapted to be secured to the end of a length of stiff wire rope, such for example, to logging cable as large as 1⅛" in diameter. Wire rope of this character is of the size and strength, hardness and stiffness, required in providing mainlines for pulling in heavy loads. It has a substantial factor of elasticity and stiffness, and when under strain, tends to lie straight. It is therefore difficult to form it into coils without the application of a great deal of force. It is necessary therefore, as is illustrated in Fig. 9, to form the loop to secure the end of a cable to said fitting in relatively wide sweeps and with plenty of slack.

As is illustrated in said figure, when the wire rope $d$ is first threaded thru the transverse aperture $c$ in the fitting, it is formed into a relatively wide loop $x$, and it is then threaded downwardly thru the second transverse aperture $f$ above the protuberance $f'$. A second wide loop $y$ is then formed, and the end of the cable $d2$, shown in dotted outline in Fig. 9, is lead thru the loop $x$ and is then seated in the pocket $h$.

As is illustrated in the figures, the lower end of loop $y$ is then fed upwardly manually thru the loop $x$, and said loop $x$ is moved downwardly as a whole and is tipped out of the plane in which it lies in Fig. 9 to a position substantially at right angles thereto, as is shown in Fig. 10. It is desirable also in many instances to take up a little of the slack of the loop $x$ thru the transverse aperture $f$ until the parts overlie at $z$, shown in Fig. 10. At this point, the portions of cable overlapping at $z$ tightly engage each other, or engage to such a degree that if the cable is then normally released, said parts are secured to each other by the inherent stiffness and engagement of the wire rope itself.

In sliding into the position shown in Fig. 10, the end of the cable emerging from the pocket is caused to be bent at a sharp angle. This causes the extreme end $d2$ to be locked into position. It is to be noted that the loop $x$ moving downwardly does not tend to pull the end of the cable from the pocket, but on the other hand tends to push it in still further. With the parts thus arranged, mechanical power can be applied to form the cable into the knot illustrated in Figs. 5 and 6. This is accomplished by securing a chain $s$ or some similar flexible element to a stake $t$ or other point of fastening and pulling the cable $d$ onto a power driven drum $u$.

The first action in moving the cable, as shown in Fig. 11, is to eliminate the loop $x$. The inherent stiffness of said cable causes the cable to engage the transverse aperture $f$ and thus the loop $x$ is first pulled out. The pulling out of said loop and the arranging of said cable in a short flat curve, as is shown in Fig. 11, causes the portion $d3$ of the cable to be lifted and seated in the transverse passageway $g$. The straightening out of said loop also causes the portion $d3$ to be pinched under the remainder to lock it in place in said passageway. It is to be noted by a comparison of Fig. 10 with Fig. 11, that the loop in straightening out has moved upwardly, that is, towards the pocket $h$, to tend to force the end $d2$ more tightly in place as said loop $x$ is being taken up. This bending tends to cause the end $d2$ to be seated tightly in place and every movement is to drive it into the pocket rather than to pull it therefrom.

After the cable is arranged, as is shown in Fig. 11, the continued movement in pulling out the loop $y$ merely is a mechanical action and a tightening of the loop, as is shown progressively in Fig. 12 and Fig. 13. When the parts are arranged as in Fig. 13, which incidentally is the same as in Fig. 5, the fitting is tightly embraced by the end of the cable and the cable is secured thereto. Sufficient tension is applied to the cable to pull it underneath the protuberance $f'$ to lock the cable in place. Said cable though stiff and elastic is distortable, and the application of such tension causes the cable to be more or less permanently distorted into the knotted form shown in detail in Figs. 5 and 6. In said postion, the cable is so secured to the fitting that the release of tension does not produce a loosening of the knot thus formed.

It is thus obvious that a workman can secure the end of a cable, even of such large diameter and of such thickness as mainline cable in logging, to a fitting of this character with nothing other than his two hands and the use of the logging engine or other hoisting engine to which said cable is attached. The fitting and the loop formed thereabout are arranged so as to take advantage of the natural tendency of said loop to first seat the end of the cable tightly in position before the remaining slack in the form of loops is removed. In the drawings, Figs. 9 to 13, inclusive, the first two operations are manual, while the last three operations, shown in Figs. 11 to 13, inclusive, are performed by the subjecting of said cable to tension by a power driven hoisting drum $u$.

I claim:

1. A coupling adapted to be bound to the end of a flexible element, said coupling comprising an elongated body defining a transverse aperture extending thru said body at one end thereof, an annular groove encircling a portion of said body, said groove communicating at its near end with said aperture, said groove extending about said body to a point where its far end intersects its near end adjacent the aperture, a pocket open at one end, lying at the side of said point adjacent the far end of said groove and being inclined at a sharp angle to said end, whereby the end of said flexible element can be looped about said body, said loop passing thru the aperture, about the groove with the end of the loop passed under the intermediate portion thereof flexed abruptly and securely seated in said pocket, and a shouldered abutment formed at the end of said groove adjacent said pocket for guiding the looped flexible element into said groove.

2. A coupling adapted to be bound to the end of a flexible element, said coupling comprising an elongated body defining a transverse aperture extending thru said body at one end thereof, an annular groove encircling a portion of said body, said groove communicating at its near end with said aperture, said groove extending about said body to a point where its far end intersects its near end adjacent the aperture, a pocket open at one end, lying at the side of said point adjacent the far end of said groove and being inclined at a sharp angle to said end, whereby the end of said flexible element can be looped about said body, said loop passing thru the aperture, about the groove with the end of the loop passed under the intermediate portion thereof flexed abruptly and securely seated in said pocket, and an open guide slot, alined with said pocket and lying to one side of said transverse passageway adapted to aid the insertion of the end of said flexible element into said pocket.

3. A coupling adapted to be bound to the end of a flexible element, said coupling comprising an elongated body defining a transverse aperture extending thru said body at one end thereof, an encircling seat extending about a narrowed portion of said body, said seat communicating at its near end with said aperture, said seat extending about said body to a point where its far end intersects its near end adjacent the aperture, a pocket lying at the side of said point adjacent the far end of said seat, whereby the end of said flexible element can be looped about said body, said loop passing thru the aperture, about the seat with the end of the loop passed under the intermediate portion thereof, and securely seated in said pocket, a portion of said groove being of greater depth than the diameter of said flexible element and having a narrower overlying portion adapted to permit the passage of said element into said portion but restraining its outward movement therefrom.

4. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture for accommodating said element, and a pocket open at one end lying adjacent the end of said way most distant from said aperture, being inclined at a sharp angle to said end whereby the end of said flexible element can be passed thru the aperture, looped about said body, arranged along the way with the end of the loop passed under the intermediate portion thereof, and flexed abruptly over the edge of and securely seated in said pocket.

5. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture for accommodating said element, and a pocket open at one end lying adjacent the end of said way most distant from said aperture, said pocket extending generally in the same direction as said transverse aperture whereby the end of said flexible element can be passed thru the aperture, looped about said body, and arranged along the way with the end of the loop passed under the intermediate portion thereof and securely seated in said pocket.

6. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture, for accommodating said element, and a pocket open at one end lying adjacent the end of said way most distant from said aperture, said pocket extending generally in the same direction as said transverse aperture and exteriorly of said encircling groove whereby the end of said flexible element can be passed thru the aperture, and arranged along the way with the end of the loop passed under the intermediate portion thereof and securely seated in said pocket.

7. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture, for accommodating said element, said way adjacent said point of intersection extending for a substantial portion of its length in alinement with said aperture in one longitudinal plane, and a pocket lying adjacent the end of said way most distant from said aperture whereby the end of said flexible element can be passed thru the aperture, looped about said body, and arranged along the way with the end of the loop passed under the intermediate portion thereof and securely seated in said pocket.

8. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture for accommodating said element, said way adjacent said point of intersection extending for a substantial portion of its length in alinement with said aperture in one longitudinal plane and extending along a gradually curved sweep in a longitudinal plane normal to said first mentioned plane, and a pocket lying adjacent the end of said way most distant from said aperture whereby the end of said flexible element can be passed thru the aperture, looped about said body, and arranged along the way with the end of the loop passed under the intermediate portion thereof and securely seated in said pocket.

9. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture, for accommodating said element, said path being a groove deeper from said near end towards said point of intersection whereby when said element lies in said groove it is positioned slightly below the point of communication of the aperture with said way, and a pocket lying adjacent the end of said way most distant from said aperture whereby the end of said flexible element can be passed thru the aperture, looped about said body, and arranged along the way with the end of the loop passed under the intermediate portion thereof and securely seated in said pocket.

10. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture for accommodating said element, said path being a groove progressively deeper from said near end towards said point of intersection whereby when said element lies in said groove it is positioned slightly below the point of communication of the aperture with said way, and a pocket lying adjacent the end of said way most distant from said aperture whereby the end of said flexible element can be passed thru the aperture, looped about said body, and arranged along the way with the end of the loop passed under the intermediate portion thereof and securely seated in said pocket.

11. A coupling adapted to be bound to the end of a flexible element comprising an elongated body defining a transverse aperture extending thru said body for passing one end of said element therethru, an encircling way communicating at its near end with said aperture and extending about said body to intersect itself adjacent said aperture for accommodating said element, said way adjacent said point of intersection extending for a substantial portion of its length in alinement with said aperture in one longitudinal plane and extending along a gradually curved sweep in a longitudinal plane normal to said first mentioned plane, said path being a groove progressively deeper from said near end towards said point of intersection whereby when said element lies in said groove it is positioned slightly below said curved portion adjacent the point of communication of the aperture with said way, and a pocket open at one end lying adjacent the end of said way most distant from said aperture and being inclined at a sharp angle to said end, said pocket extending generally in the same direction as said transverse aperture and exteriorly of said encircling groove, said pocket being proportioned to receive and hold securely the extreme end of said flexible element whereby the end of said flexible element can be passed thru the aperture, looped about said body, arranged along the way with the end of the loop passed under the intermediate portion thereof and flexed abruptly over the edge of and securely seated in said pocket.

WILLIAM A. MEIGHAN.